US010452473B2

(12) United States Patent
Kazemi et al.

(10) Patent No.: US 10,452,473 B2
(45) Date of Patent: *Oct. 22, 2019

(54) METHODS FOR MANAGING FAILURE OF A SOLID STATE DEVICE IN A CACHING STORAGE

(71) Applicant: HGST Technologies Santa Ana, Inc., Santa Ana, CA (US)

(72) Inventors: Saied Kazemi, Mountain View, CA (US); Siddharth Choudhuri, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/976,518

(22) Filed: Dec. 21, 2015

(65) Prior Publication Data
US 2016/0110251 A1   Apr. 21, 2016

Related U.S. Application Data

(63) Continuation of application No. 13/689,074, filed on Nov. 29, 2012, now Pat. No. 9,218,257.
(Continued)

(51) Int. Cl.
*G06F 11/00* (2006.01)
*G06F 11/10* (2006.01)
(Continued)

(52) U.S. Cl.
CPC .......... *G06F 11/1064* (2013.01); *G06F 3/061* (2013.01); *G06F 3/0655* (2013.01);
(Continued)

(58) Field of Classification Search
CPC .... G06F 11/073; G06F 11/141; G06F 11/142; G06F 11/1428; G06F 11/1658; G06F 11/20; G06F 11/2094; G06F 3/061; G06F 3/0629; G06F 3/0655; G06F 3/0689; G06F 12/0833; G06F 12/0868; G06F 12/0871;
(Continued)

(56) References Cited

U.S. PATENT DOCUMENTS 6,223,231 B1   4/2001   Mankude
6,385,665 B1   5/2002   Canady et al.
(Continued)

OTHER PUBLICATIONS

Editor, Fusion-io Collaborating with SCSI Trade Association Members in Driving Open SCSI Express Standards, May 3, 2012, SCSI Trade Association (Year: 2012).*
(Continued)

*Primary Examiner* — Marc Duncan
(74) *Attorney, Agent, or Firm* — Morgan, Lewis & Bockius LLP

(57) ABSTRACT

Techniques for managing caching use of a solid state device are disclosed. In some embodiments, the techniques may be realized as a method for managing caching use of a solid state device. Management of the caching use may include receiving, at a host device, notification of failure of a solid state device. In response to the notification a cache mode may be set to uncached. In uncached mode input/output (I/O) requests may be directed to uncached storage (e.g., disk).

20 Claims, 7 Drawing Sheets

Related U.S. Application Data

(60) Provisional application No. 61/651,468, filed on May 24, 2012.

(51) Int. Cl.
  *G06F 11/20* (2006.01)
  *G06F 11/14* (2006.01)
  *G06F 3/06* (2006.01)
  *G06F 12/0831* (2016.01)
  *G06F 12/0868* (2016.01)
  *G06F 12/0871* (2016.01)
  *G06F 11/16* (2006.01)

(52) U.S. Cl.
  CPC .......... *G06F 3/0689* (2013.01); *G06F 11/141* (2013.01); *G06F 11/2094* (2013.01); *G06F 12/0833* (2013.01); *G06F 12/0868* (2013.01); *G06F 12/0871* (2013.01); *G06F 11/1658* (2013.01); *G06F 2212/604* (2013.01); *G06F 2212/62* (2013.01)

(58) Field of Classification Search
  CPC ....... G06F 2212/604; G06F 2212/6042; G06F 2212/62
  See application file for complete search history.

(56) References Cited

U.S. PATENT DOCUMENTS

| | | | |
|---|---|---|---|
| 6,684,265 B2 | 1/2004 | Graf | |
| 6,901,484 B2* | 5/2005 | Doyle | G06F 3/0601 711/133 |
| 7,293,144 B2* | 11/2007 | Matsui | G06F 12/0871 711/130 |
| 7,496,715 B1 | 2/2009 | Vartti et al. | |
| 7,603,672 B1* | 10/2009 | Andrighetti | G06F 9/30047 710/23 |
| 7,634,585 B2 | 12/2009 | Conley et al. | |
| 7,890,795 B1 | 2/2011 | Madnani et al. | |
| 7,930,583 B1* | 4/2011 | Vemuri | G06F 11/0727 709/223 |
| 8,234,467 B2 | 7/2012 | Noguchi et al. | |
| 8,560,775 B1* | 10/2013 | McDuffee | G06F 3/0614 711/114 |
| 8,615,678 B1 | 12/2013 | Madnani et al. | |
| 9,098,417 B2* | 8/2015 | Loh | G06F 12/0842 |
| 9,330,012 B2* | 5/2016 | Chockler | G06F 9/5016 |
| 9,361,232 B2* | 6/2016 | Umamageswaran | G06F 12/084 |
| 2002/0129123 A1* | 9/2002 | Johnson | H04L 65/4084 709/219 |
| 2004/0024941 A1 | 2/2004 | Olarig et al. | |
| 2004/0117441 A1* | 6/2004 | Liu | G06F 12/0888 709/203 |
| 2004/0139447 A1 | 7/2004 | Hope et al. | |
| 2004/0210795 A1 | 10/2004 | Anderson | |
| 2004/0221204 A1 | 11/2004 | Johnson | |
| 2005/0102582 A1 | 5/2005 | Fuente et al. | |
| 2009/0204764 A1* | 8/2009 | Larson | G06F 9/5016 711/125 |
| 2010/0100775 A1 | 4/2010 | Slutsman et al. | |
| 2010/0235569 A1* | 9/2010 | Nishimoto | G06F 12/06 711/103 |
| 2011/0047437 A1* | 2/2011 | Flynn | G06F 9/52 714/758 |
| 2011/0145505 A1* | 6/2011 | Anand | G06F 12/0895 711/130 |
| 2012/0290789 A1* | 11/2012 | Susarla | H04L 41/5022 711/118 |
| 2013/0097458 A1 | 4/2013 | Sekino et al. | |
| 2013/0246841 A1 | 9/2013 | Cagno et al. | |
| 2014/0310373 A1* | 10/2014 | Aviles | H04L 41/0893 709/213 |

OTHER PUBLICATIONS

Kidd, Mark, Advancements in PCIe Storage including SCSI Express [STA 2012], May 15, 2012, Storage Review (Year: 2012).*

* cited by examiner

METHODS FOR MANAGING FAILURE OF A SOLID STATE DEVICE IN A CACHING STORAGE

CROSS-REFERENCE TO RELATED APPLICATION(S)

This application is a continuation of U.S. patent application Ser. No. 13/689,074 filed Nov. 29, 2012, entitled "Methods for Managing Failure of a Solid State Device in a Caching Storage," the contents of which are expressly incorporated by reference herein in its entirety and for all purposes. U.S. patent application Ser. No. 13/689,074 claims priority from U.S. Provisional Patent Application No. 61/651,468, entitled "Methods For Managing Caching Use Of A Solid State Device," filed May 24, 2012, which is expressly incorporated herein by reference in its entirety.

BACKGROUND

Caching is the temporary storage of data for subsequent retrieval. Memory devices are often used to store data provided by a computer program. Examples of memory storage devices include, but are not limited to, solid-state drives, hard disk drives, and optical drives. These types of storage devices are inexpensive and hold large amounts of data. However, one tradeoff for their economic value is that they are slow compared to other components used in a computer. For example, a consumer hard drive can store terabytes of data cheaply, but has a maximum theoretical transfer rate of 300 megabytes (MB) per second. Random access memory (RAM) is faster in performance but higher in price, with a maximum theoretical transfer rate of 12.8 gigabytes (GB) per second. A central processing unit (CPU) with specialized memory known as level 1 (L1) cache or level 2 (L2) cache has even better performance but at an even higher price, with a transfer rate of 16 GB per second, or over fifty times faster than the storage device.

Because computer components exhibit this tradeoff between price and performance, a technique known as caching may be used to increase, or accelerate, overall system performance. Caching may be used to store data requested from one component, into another component, to speed future requests for the same data. The data stored in a cache often may be values previously requested by a software application, by an operating system, or by another hardware component. Caching organizes a small amount of fast-access memory and a large amount of slow-access memory. The first time that a value is requested, the data is not in the cache, so the requested value is retrieved from the slow-access memory. In a cache, when the value is retrieved from the slow-access memory, the value is sent to the component that requested it, and the value also is stored in the fast-access memory for future requests. The next time that the same value is requested by the operating system or by any other program, the value is retrieved from the fast-access memory, with the result that the overall system performance is faster, or accelerated, by virtue of the value being available from the fast-access memory. By using faster memory components to cache data, the more requests that can be served from the cache instead of the slower storage device, and the faster the overall system performance.

However, failure of the faster memory components frequently results in disruption or downtime of applications and processes relying on the caching. Additionally, replacing or adding faster memory components to a system can result in downtime or disruption of applications relying on the host.

In view of the foregoing, it may be understood that there may be significant problems and shortcomings associated with current technologies for caching using faster memory components.

SUMMARY OF THE DISCLOSURE

Techniques for managing caching use of a solid state device are disclosed. In some embodiments, the techniques may be realized as a method for managing caching use of a solid state device. Management of the caching use may include receiving, at a host device, notification of failure of a solid state device. In response to the notification a cache mode may be set to uncached. In uncached mode input/output (I/O) requests may be directed to uncached storage (e.g., disk).

In accordance with additional aspects of this exemplary embodiment, the techniques may further include receiving, at the host device, notification of a detected solid state device. In response to detection of a solid state device, the solid state device may be initialized. Upon initialization a cache mode may be set to cached. In a cached mode, input/output requests may be directed to the solid state device.

According to some embodiments, upon detection of a solid state device cache management software of a host device may verify that a storage size of the host device is the same as a prior failed cache device.

According to some embodiments, cache management software may receive an indication of a partition on a solid state device to use for caching, a storage size indication, or another indicator of an available amount of cache space on a solid state device. Cache management software of a host device may adjust an amount of data cached according to an amount of cache space available on a detected solid state device. According to some embodiments, cache management software may identify an amount of storage space available on a detected solid state device and may adjust an amount of data cached according to the amount of cache space available on the detected solid state device.

In accordance with further aspects of this exemplary embodiment, the host device may comprise at least one of: an enterprise server, a database server, a workstation, a computer, a mobile phone, a game device, a personal digital assistant (PDA), an email/text messaging device, a digital camera, a digital media (e.g., MP3) player, a GPS navigation device, and a TV system.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 1 shows an exemplary block diagram depicting a solid state device in communication with a host device, in accordance with an embodiment of the present disclosure.

DESCRIPTION

The present disclosure relates to cache management providing graceful handling of failure of cache devices. The cache management may include receiving, at a host device, notification of failure of a solid state device. In response to the notification a cache mode may be set to uncached. In uncached mode input/output (I/O) requests may be directed to uncached storage (e.g., disk).

Cache management techniques may also include receiving, at a host device, notification of a detected solid state device. In response to detection of the solid state device, the solid state device may be initialized. Upon initialization a cache mode may be set to cached. In a cached mode, input/output requests may be directed to the solid state device. Cache management techniques are discussed in further detail below.

Figure 1:
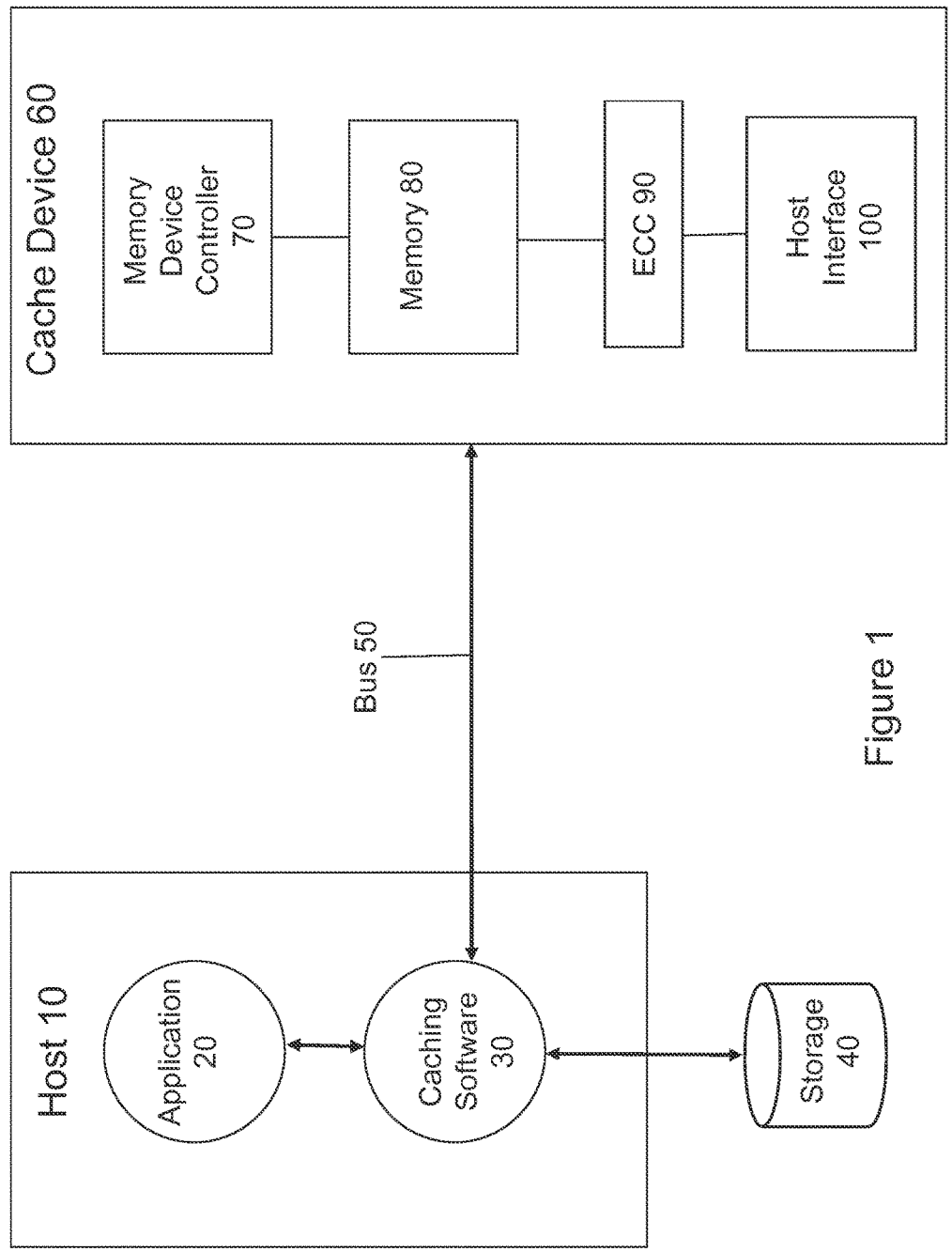

Turning now to the drawings, FIG. 1 is an exemplary block diagram depicting a solid state device in communication with a host device, in accordance with an embodiment of the present disclosure. FIG. 1 includes a number of computing technologies such as a host 10, application 20, caching software 30, a bus 50, a cache device 60, a memory device controller 70, a memory 80, an Error Correcting Code (ECC) memory block 90, and a host interface 100. The bus 50 may use suitable interfaces standard including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe).

As used herein, the phrase "in communication with" means in direct communication with or in indirect communication with via one or more components named or unnamed herein (e.g., a memory card reader). The host 10 and the cache device 60 can be in communication with each other via a wired or wireless connection and may be local to or remote from one another. According to some embodiments, the cache device 60 can include pins (or a socket) to mate with a corresponding socket (or pins) on the host 10 to establish an electrical and physical connection. According to one or more other embodiments, the cache device 60 includes a wireless transceiver to place the host 10 and cache device 60 in wireless communication with each other.

The host 10 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system. The cache device 60 can also take any suitable form, such as, but not limited to, a universal serial bus (USB) device, a memory card (e.g., an SD card), a hard disk drive (HDD), a solid state device (SSD), and a redundant array of independent disks (RAID). Also, instead of the host device 10 and the cache device 60 being separately housed from each other, such as when the host 10 is an enterprise server and the cache device 60 is an external card, the host 10 and the cache device 60 can be contained in the same housing, such as when the host 10 is a notebook computer and the cache device 60 is a hard disk drive (HDD) or solid-state device (SSD) internal to the housing of the computer.

As shown in FIG. 1, the host 10 can include application 20 and caching software 30. In general, application 20 may reside on host 10 or remote from host 10. Application 20 may request data from caching software 30. Caching software 30 may be configured to send input/output (I/O) requests to cache device 60 via the bus 50. Caching software 30 may direct input/output (I/O) requests for data not stored on cache device 60 to storage 40. The memory 80 stores data for use by the host 10. The cache device 60 contains a host interface 100, which is configured to receive commands from and send acknowledgments to the host 10 using the interface standard appropriate for the bus 50. The cache device 60 may also contain a memory device controller 70 operative to control various operations of the cache device 60, an optional Error Correcting Code (ECC) memory block 90 to perform ECC operations, and the memory 80 itself.

The memory 80 can take any suitable form, such as, but not limited to, a solid-state memory (e.g., flash memory, or solid state device (SSD)), optical memory, and magnetic memory. While the memory 80 is preferably non-volatile, a volatile memory also can be used. Also, the memory 80 can be one-time programmable, few-time programmable, or many-time programmable. In one embodiment, the memory 80 takes the form of a raw NAND die; however, a raw NOR die or other form of solid state memory can be used.

The host 10 and the cache device 60 can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Storage 40 may utilize a redundant array of inexpensive disks ("RAID"), magnetic tape, disk, Direct-attached storage (DAS), a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage.

Caching software 30 may receive I/O requests from application 20 and may forward requests for cached data to cache device 60 and may return retrieved data. Caching software 30 may forward I/O requests for uncached data to storage 40 and may return retrieved data. According to some embodiments, caching software 30 may implement one or more caching algorithms to improve cache performance. For example, caching software 30 may implement one or more of a Least Recently Used (LRU) algorithm, a Least Frequently Used (LFU) algorithm, a Most Recently Used algorithm, or another caching algorithm.

Figure 2A:
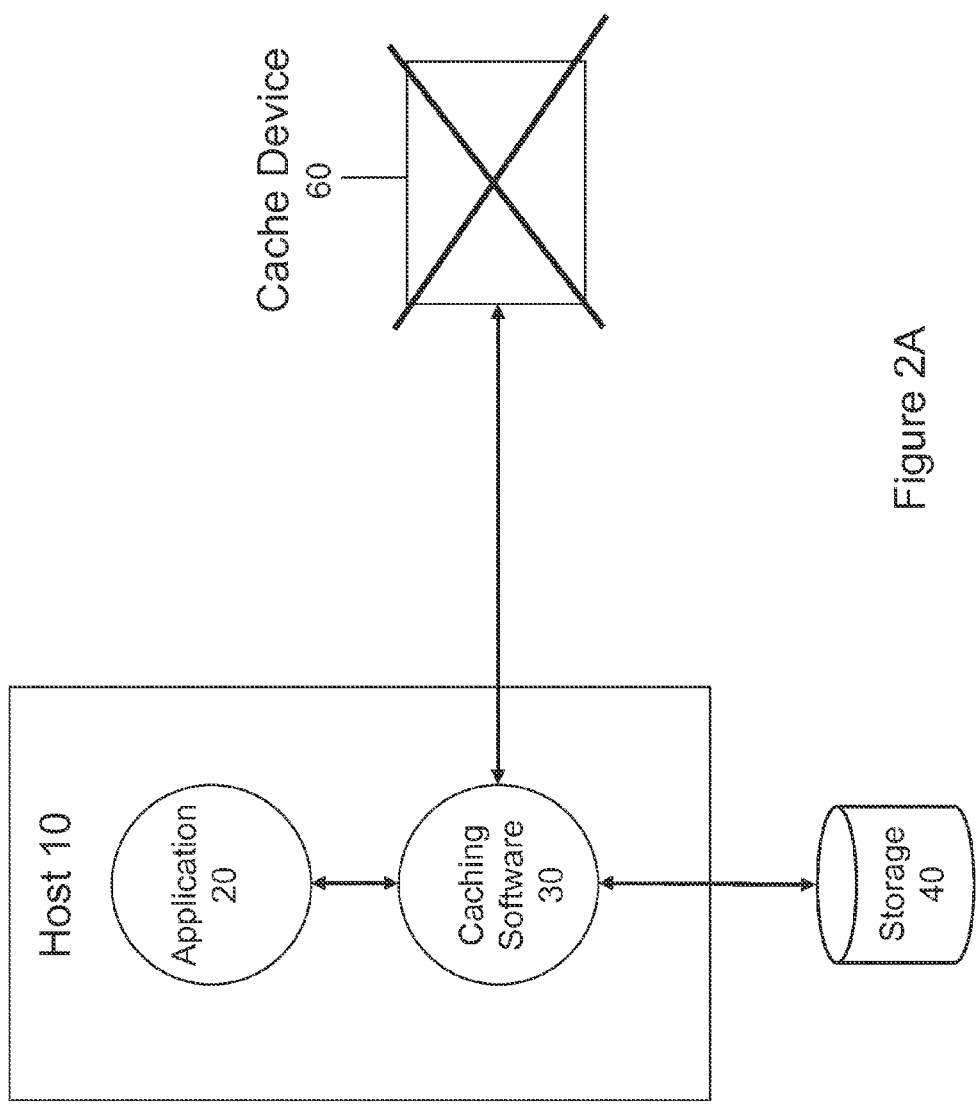
FIG. 2A provides an exemplary block diagram depicting a host device encountering a problem with a solid state device, in accordance with an embodiment of the present disclosure.

FIG. 2A provides an exemplary block diagram depicting a host device encountering a problem with a solid state device, in accordance with an embodiment of the present disclosure. As illustrated in FIG. 2A, cache device 60 may fail, be removed, lose power, or otherwise be inaccessible to host 10. According to some embodiments, caching software 30 may allow caching operations to operate without perceived I/O errors to application 20 or a user of application 20. Caching software 30 may thus allow for graceful failure and/or hot swapping of a cache device.

As illustrated in FIG. 2A, memory device 110 may fail or otherwise be inaccessible to host 10. Caching software may set a caching mode to uncached. In an uncached mode all I/O requests received by caching software 30 may be directed to storage 40. Caching may be performed in a read-through cache mode, a write-through cache mode, or another caching mode in which loss of a cache will not result in loss of data. I/O requests which are sent to cache prior to failure but not yet returned may return with a failure. These I/O requests may be a small number if any and may be handled without significant or discernable impact to an application or an application user. A failed I/O request may be retried and successfully serviced by caching software 30 from storage 40. Caching operations may continue in an uncached mode without disruption to application 20 or host 10.

According to one or more embodiments, caching may be performed using Solid State Devices (SSDs). SSD removal or failure may cause an event trigger. For example, a SCSI notifier function or a fibre channel Registered State Change Notification (RSCN) may fire. Caching software 30 may be registered to receive such notifications from such notifiers. Caching software 30 may implement a device notifier handler to react to such events.

According to some embodiments, an alternative or an additional notification mechanism may be implemented. A device manager subsystem may be notified when cache device 60 is removed. For example, in a Linux™ implementation a udev subsystem may be notified via a netlink socket. Scripts or other executable code may be triggered in response to the device manager notification which notify caching software 30. Upon receipt of the notification caching software 30 may put the caching status to an uncached mode and may direct all subsequent I/Os to storage 40. In embodiments, in which multiple notification mechanisms are implemented, caching software 30 may handle a first notification and ignore duplicate subsequent notifications. Other implementations of caching software 30 may be implemented on Windows™, Vmware™, Mac OS X™, Solaris™, or other platforms.

According to some embodiments, caching software 30 may log the error and/or may perform one or more additional actions. Caching software 30 may generate a notification via email, Short Message Service (SMS), HTTP, or other electronic communication. According to embodiments in which a plurality of cache devices are available, a portion of an alternative cache device may be allocated.

Figure 2B:
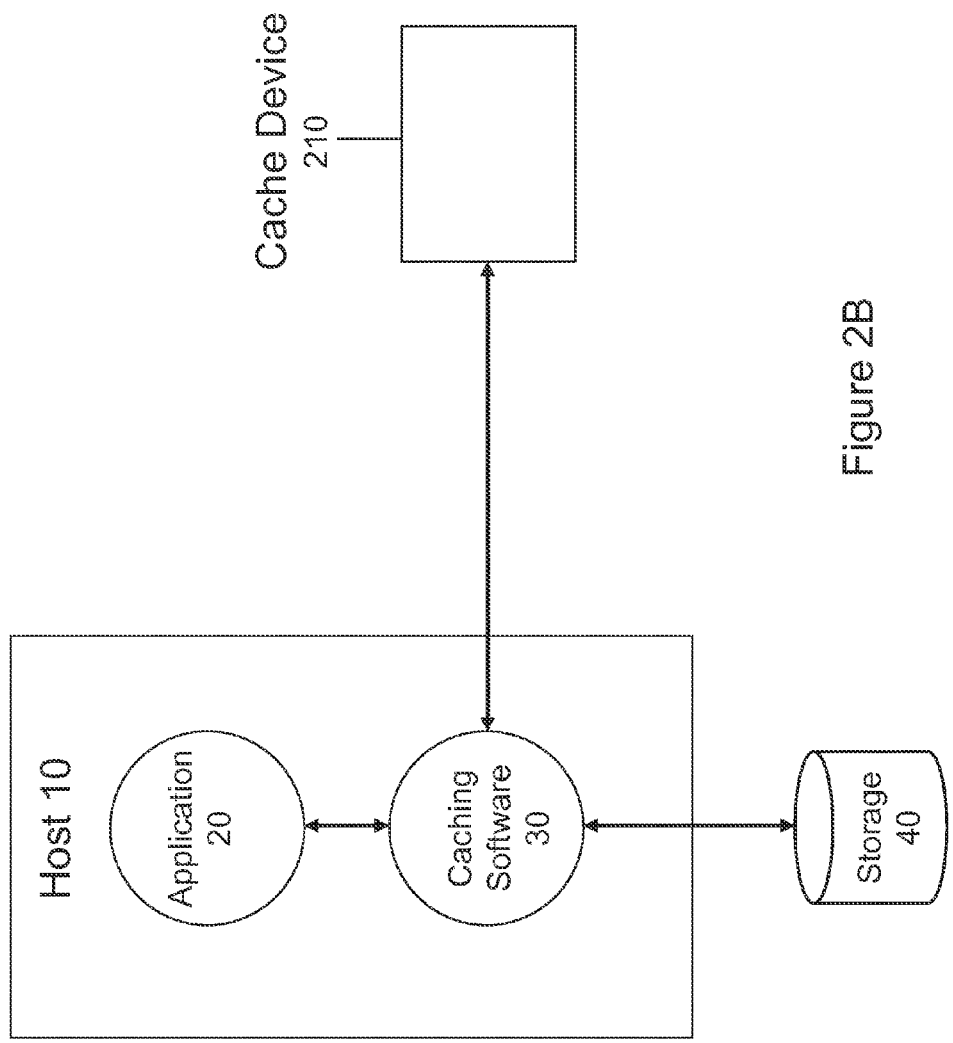
FIG. 2B shows an exemplary block diagram depicting a solid state device resuming communication with a host device, in accordance with an embodiment of the present disclosure.

FIG. 2B shows an exemplary block diagram depicting a solid state device resuming communication with a host device, in accordance with an embodiment of the present disclosure. Cache device 210 may be a same device as cache device 60 or a new cache device. For example, a cache device may regain power and come back online or a failed device may be replaced with a new cache device. Caching software 30 may detect or receive notification of the presence of cache device 210. Upon detection of cache device 210, caching software 30 may determine if a memory size of cache device 210 is the same as previously allocated. According to some embodiments, if a memory size is different an error may be returned. Caching software 30 may receive an indication of a partition on a solid state device to use for caching, a storage size indication, or another indicator of an available amount of cache space on a solid state device. According to other embodiments, caching software 30 may adjust an amount of data cached according to an amount of cache space available on a detected solid state device. Caching software 30 may identify an amount of storage space available on a detected solid state device and may decrease an amount of data cached if a cache device size is smaller than expected or may increase an amount of data cache if a cache device size is larger than expected.

After verification of the cache size or adjustment of the cache size, caching software 30 may reinitialize the cache. Upon completion of reinitialization, caching software 30 may set a cache mode from uncached to cached. After the mode change, I/O requests received by caching software 30 may be directed to cache device 210.

Caching software 30 may receive a notification of a cache device through one or more notification mechanisms. According to some embodiments, a notification mechanism may verify that a cache device is a same cache device, may provide an indication of an available cache size, and/or may provide other cache device information. According to some embodiments, when a cache device is added a notification is provided via a device manager. For example, in a Linux™ implementation a udev subsystem may be notified via a netlink socket. Scripts or other executable code may be triggered in response to the device manager notification which notify caching software 30. Upon receipt of the notification caching software 30 may reinitialize cache as if it were a cold cache. Upon completion of initialization, caching software 30 may set a cache status to cached.

Caching software 30 also may provide a mechanism to put the caching software into an uncached mode without failure or removal of cache. For example, backup software may access all data in storage for a full backup regardless of whether such data has been recently used, frequently used, or even accessed at all. The read requests associated with backup software may skew statistics used for caching software. Caching software 30 may allow a manual setting to an uncached mode to prevent caching statistics from being distorted in response to backup or archive read requests. Similarly, caching software 30 may permit setting to an uncached mode to avoid distortion of statistics in response to an anti-virus scan. According to some embodiments, caching software 30 may receive information about a process requesting data or generating I/Os and may exclude or include I/O requests in caching statistics based on a source of an I/O request. I/O sources may be identified by users, applications, groups, subnets, or other criteria associated with an I/O request. For example, I/Os generated by a virus scan, a backup process, an archive process, a software installation, a software upgrade, and/or other specified processes may be excluded from caching statistics. According to some embodiments, caching software 30 may permit prioritization of I/O caching statistics. For example, I/O associated with certain higher priority applications or users may be ranked higher. Such higher ranked I/O may be flushed from cache less frequently. Some embodiments may permit identification of lower priority applications for which data is less likely to be cached or applications for which data may expire from cache quicker. In one or more embodiments, caching software 30 different priority I/O sources may be allocated different amount of cache space.

Figure 3:
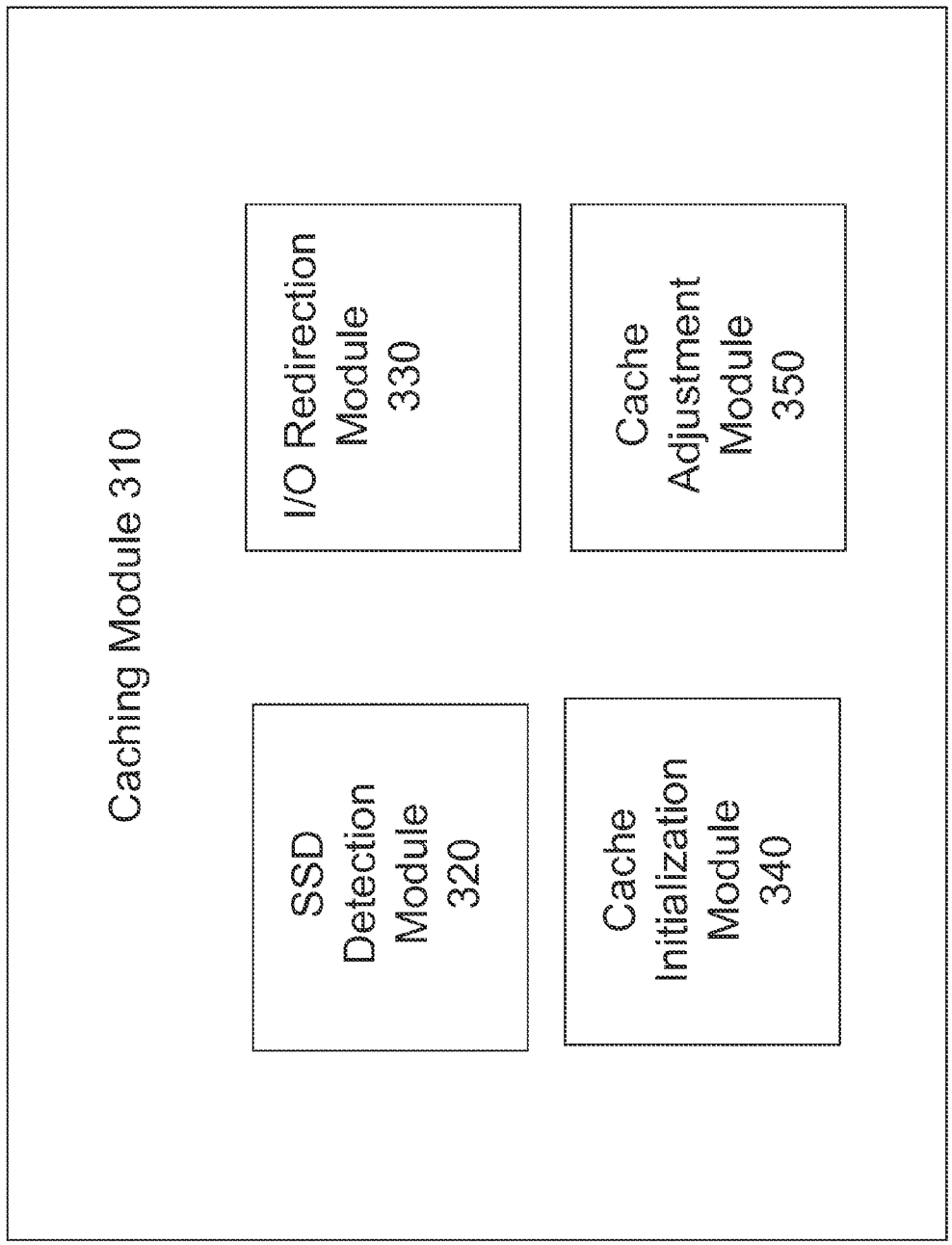
FIG. 3 depicts an exemplary module for handling caching during solid state device failure, in accordance with an embodiment of the present disclosure.

FIG. 3 depicts an exemplary module for handling caching during solid state device failure, in accordance with an embodiment of the present disclosure. As illustrated in FIG. 3, caching module 310 may contain SSD detection module 320, I/O redirection module 330, cache initialization module 340, and cache adjustment module 350.

SSD detection module 320 may detect cache device status changes or receive notifications of such changes. For example, SSD detection module 320 may detect or receive notification of a cache device failure or a cache device coming online. A SCSI notifier function or a fibre channel Registered State Change Notification (RSCN) may fire. SSD Detection module 320 may be registered to receive such notifications from such notifiers. SSD Detection module 320 may implement a device notifier handler to react to such events.

According to some embodiments, an alternative or an additional notification mechanism may be implemented. A device manager subsystem may be notified when cache device 60 is removed. For example, in a Linux™ implementation a udev subsystem may be notified via a netlink socket. Scripts or other executable code may be triggered in response to the device manager notification which notify SSD Detection module 320. Upon receipt of the notification, SSD detection module 320 may put the caching status to an uncached mode and may direct all subsequent I/Os to storage 40. In embodiments, in which multiple notification mechanisms are implemented, SSD detection module 320 may handle a first notification and ignore duplicate subsequent notifications. Other implementations of SSD detection module 320 may be implemented on Windows™, Vmware™, Mac OS X™, Solaris™, or other platforms.

I/O redirection module 330 may respond to changes in cache device status. SSD detection module 320 may provide device status change information to I/O redirection module 330. I/O redirection module 330 may redirect I/Os directly to source storage (e.g., disk) when a caching mode is changed to uncached. I/O redirection module 330 may redirect I/Os to a cache device upon notification that a caching status mode is changed to cached.

Cache initialization module 340 may initialize new cache devices or reinitialize cache devices coming back online. Cache may be initialized as cold cache. Upon completion of initialization, cache initialization module may notify I/O redirection module 330.

Cache adjustment module 350 may adapt caching software to different size caches coming online. According to some embodiments, cache adjustment module 350 may return an error if a cache device coming online is of a different size than an expected cache size. Cache adjustment module 350 may receive an indication of a partition on a solid state device to use for caching, a storage size indication, or another indicator of an available amount of cache space on a solid state device. According to some embodiments, cache adjustment module 350 may adjust an amount of data cached according to an amount of cache space available on a detected solid state device. caching software 30 may identify an amount of storage space available on a detected solid state device and may decrease an amount of data cached if a cache device size is smaller than expected or may increase an amount of data cache if a cache device size is larger than expected.

Figure 4:
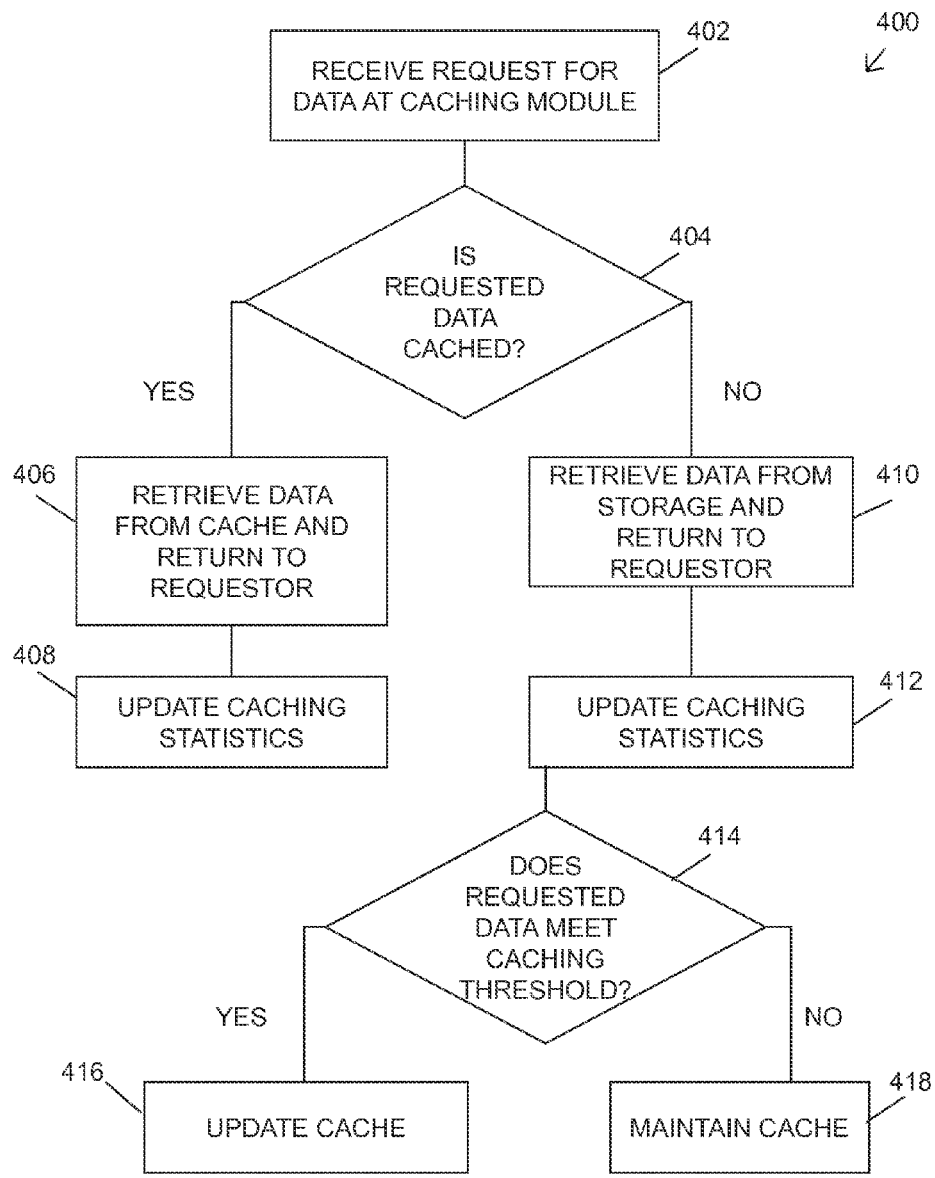
FIG. 4 depicts a flowchart illustrating caching using a solid state device, in accordance with an embodiment of the present disclosure.

FIG. 4 depicts a flowchart illustrating caching using a solid state device, in accordance with an embodiment of the present disclosure. The process 400, however, is exemplary only. The process 400 can be altered, e.g., by having stages added, changed, removed, or rearranged.

At stage 402 a request is received for data at a caching module. At stage 404 a determination may be made as to whether requested data is cached. According to some embodiments, this determination may be made by sending an I/O request to cache and determining whether the result is a cache hit or cache miss (e.g., a successful attempt to read or write data or a failed attempt to read or write data). If the requested data is in cache the method 400 may continue at stage 406. If the requested data is not in cache the method 400 may continue at block 410.

If requested data is available in cache, at stage 406 data may be retrieved from cache and returned to a requestor. At stage 408, cache statistics may be updated to reflect the request.

If requested data is not available in cache, at stage 410 the requested data may be retrieved from storage and returned to a requestor. At stage 412 caching statistics may be updated. The method 400 may continue at stage 414.

At stage 414, it may be determined whether requested data meets a caching threshold. In some embodiments, all data read or written as an I/O may be cached initially and then aged out if not accessed (e.g., purged from cache according to one or more caching algorithms). For example, a least-recently used, least-frequently used, most-recently used, or other caching algorithm may be used. According to some embodiments, cache management software may evaluate one or more indicators associated with an I/O request and/or associated data. For example, the source of an I/O request may be evaluated to determine whether it is a high priority I/O request. At stage 416, if an I/O request meets a caching threshold, the cache may be updated to include the data of the I/O. At stage 418, if an I/O request does not meet a caching threshold, the cache may be not be updated to include the data of the I/O.

Figure 5:
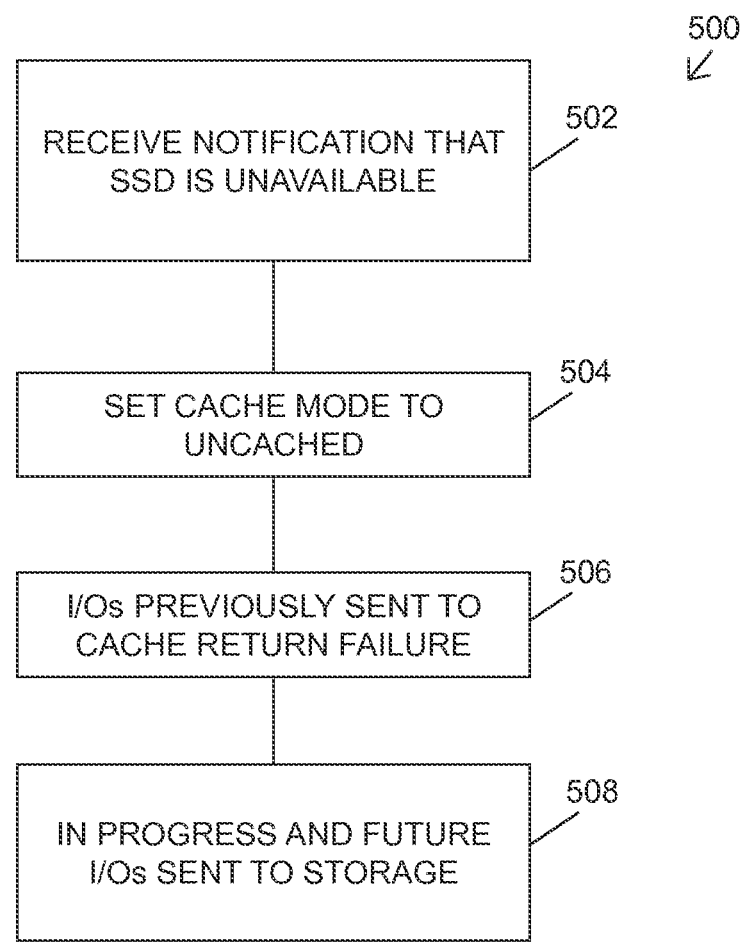
FIG. 5 depicts a flowchart illustrating management of caching during failure of a solid state device, in accordance with an embodiment of the present disclosure.

FIG. 5 depicts a flowchart illustrating management of caching during failure of a solid state device, in accordance with an embodiment of the present disclosure. The process 500, however, is exemplary. The process 500 can be altered, e.g., by having stages added, changed, removed, or rearranged.

At stage 502, notification may be received that a SSD is unavailable. According to some embodiments, a Small Computer System Interface (SCSI) notifier function or a fibre channel Registered State Change Notification (RSCN) can fire. A device notifier handler may be implemented by cache management software to react to such events. According to some embodiments, an alternative or an additional notification mechanism may be implemented. A device manager subsystem may be notified when cache device 60 is removed. For example, in a Linux™ implementation a udev subsystem may be notified via a netlink socket. Scripts or other executable code may be triggered in response to the device manager notification which notify cache management software. In embodiments, in which multiple notification mechanisms are implemented, cache management software may handle a first notification and ignore duplicate subsequent notifications. Other embodiments of cache management software may be implemented on Windows™, Vmware™, Mac OS X™, Solaris™, or other platforms.

Upon receipt of the notification that the SSD cache is unavailable, at stage 504 cache management software may put the caching status to an uncached mode. At stage 506, I/O requests which are sent to cache prior to failure but not yet returned may return with a failure. These I/O requests may be a small number if any and may be handled without significant or discernable impact to an application or an application user. A failed I/O request may be retried and successfully serviced by caching software from storage 40. Caching operations may continue in an uncached mode without disruption to applications or hosts. At stage 508, in progress and future I/Os may be redirected to storage (e.g., disk).

Figure 6:
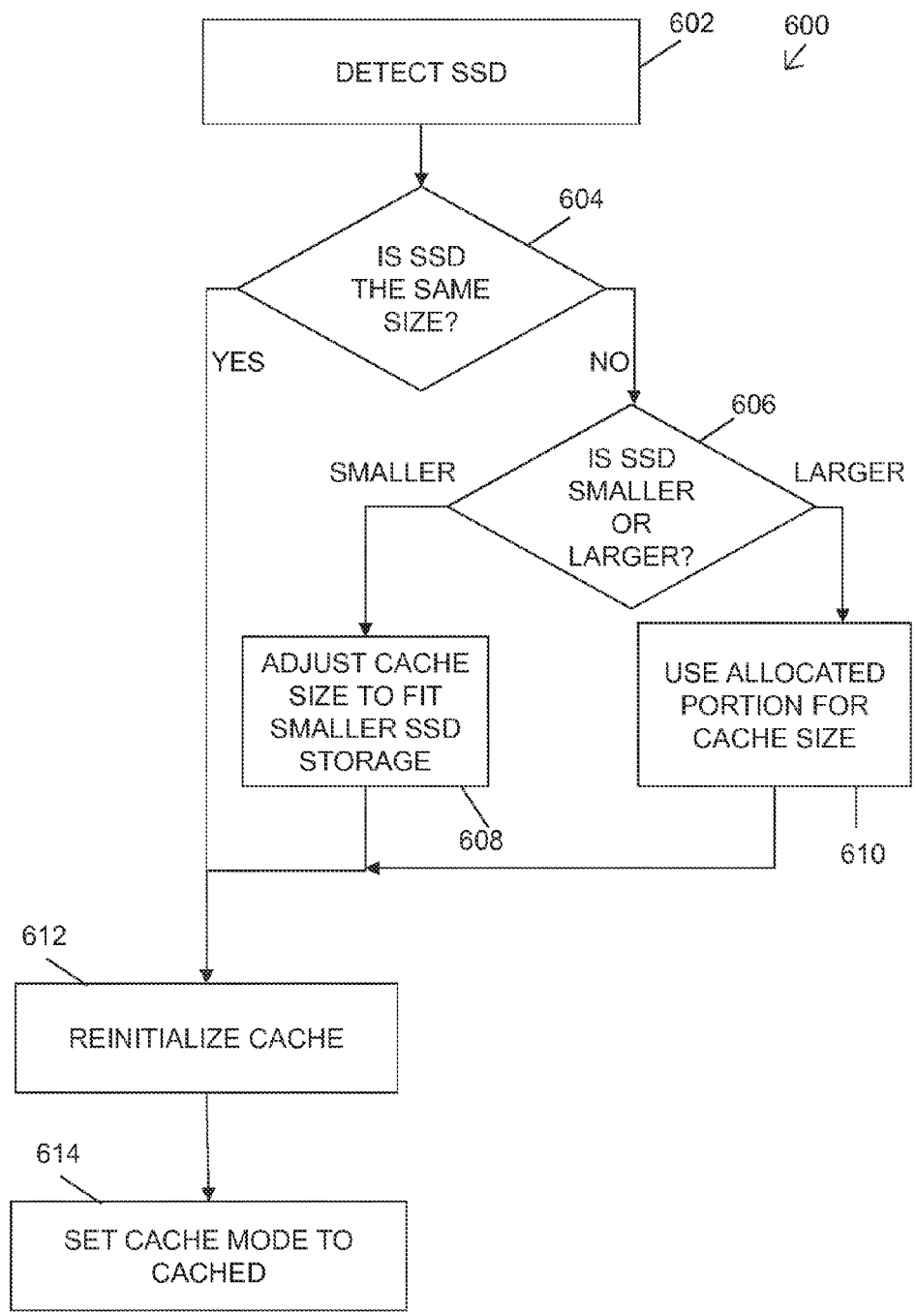
FIG. 6 depicts a flowchart illustrating resumption of caching after detection of a solid state device, in accordance with an embodiment of the present disclosure.

FIG. 6 depicts a flowchart illustrating resumption of caching after detection of a solid state device, in accordance with an embodiment of the present disclosure. The process 600, however, is exemplary. The process 600 can be altered, e.g., by having stages added, changed, removed, or rearranged.

At stage 602, a cache device such as for example, a SSD, may be detected. Cache management software may detect cache device status changes or receive notifications of such changes. For example, cache management software may detect or receive notification of a cache device failure or a cache device coming online. A Small Computer System Interface (SCSI) notifier function or a fibre channel Registered State Change Notification (RSCN) may fire. Cache management software may implement a device notifier handler to react to such events.

According to some embodiments, an alternative or an additional notification mechanism may be implemented. A device manager subsystem may be notified when cache device 60 is removed. For example, in a Linux™ implementation a udev subsystem may be notified via a netlink socket. Scripts or other executable code may be triggered in response to the device manager notification which notify cache management software.

At stage 604 upon detection of a cache device, caching management software may determine if a memory size of cache device is the same as previously allocated. If a cache device is the same size as a cache previously allocated, the method 600 may continue at stage 612. According to some embodiments, if a memory size is different from the cache previously allocated, an error may be returned. According to other embodiments, if a cache device is a different size the method 600 may continue at stage 606.

Cache management software may receive an indication of a partition on a solid state device to use for caching, a storage size indication, or another indicator of an available amount of cache space on a solid state device. According to one or more embodiments, cache management software may adjust an amount of data cached according to an amount of cache space available on a detected solid state device. At stage 606, cache management software may determine whether an amount of storage space available on a detected solid state device is less than or greater than an expected storage space size (e.g., a prior cache size). At stage 608, cache management software may decrease an amount of data cached if a cache device size is smaller than expected. At stage 610, cache management software may increase an amount of data cached if a cache device size is larger than expected.

At stage 612, the cache device may be reinitialized. Cache management software may treat a cache device as if it were a cold cache.

At stage 614, upon completion of reinitialization, cache management software may set a cache mode from uncached to cached. After the mode change, I/O requests received by cache management software may be directed to the cache device.

Other embodiments are within the scope and spirit of the invention. For example, the functionality described above can be implemented using software, hardware, firmware, hardwiring, or combinations of any of these. One or more computer processors operating in accordance with instructions may implement the functions associated with managing use of cache devices in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for managing caching use of a solid state device comprising:

receiving, at a host device of a memory system, a first notification of failure of a first solid state device that is configured to operate as a cache memory device and is coupled to the host device, wherein the first solid state device is physically or electrically inaccessible to the host device due to the failure, and wherein the first notification comprises a fiber channel registered state change notification (RSCN);

setting, at the host device, a cache mode of the memory system to an uncached mode in response to receiving the first notification, wherein the memory system directs input/output (I/O) requests to a storage device coupled to the host device when the cache mode is the uncached mode;

receiving, at the host device, a second notification about a second solid state device, coupled to the host device, indicating that the second solid state device has been detected for use as a cache memory device;

setting, at the host device, the cache mode of the memory system to a cached mode in response to receiving the second notification;

allocating, at the host device, an amount of cache space of the cache memory device of the second solid state device to an input/output (I/O) generator based on a priority associated with the input/output generator;

receiving information about a source of input/output (I/O) requests; and excluding the input/output (I/O) requests from input/output (I/O) caching statistics based on the source of the I/O requests.

2. The method of claim 1, comprising:
prioritizing the input/output (I/O) caching statistics of the cache memory device such that higher ranked input/output (I/O) is flushed from the cache memory device less frequently.

3. The method of claim 2, wherein the higher ranked input/output (I/O) is based on a predetermined priority associated with an application.

4. The method of claim 2, wherein the higher ranked input/output (I/O) is based on a predetermined priority associated with a user.

5. The method of claim 1, comprising:
identifying lower priority applications for which data is less likely to be cached.

6. The method of claim 1, comprising:
identifying lower priority applications for which data may expire from the cache memory device quicker.

7. The method of claim 1, wherein the information indicates the source is an application.

8. The method of claim 7, wherein the application comprises one of a virus scanner, a backup software, a software installer, or a software upgrade.

9. The method of claim 1, wherein the information indicates the source is associated with a user.

10. The method of claim 1, wherein the information indicates the source is associated with a group or subnet.

11. A non-transitory computer readable media comprising a series of instructions executable on a computer, wherein when executed by the computer the instructions cause:

receiving, at a host device of a memory system, a first notification of failure of a first solid state device that is configured to operate as a cache memory device and is coupled to the host device, wherein the first solid state device is physically or electrically inaccessible to the host device due to the failure, and wherein the first notification comprises a fiber channel registered state change notification (RSCN);

setting, at the host device, a cache mode of the memory system to an uncached mode in response to receiving the first notification, wherein the memory system is configured to direct input/output (I/O) requests to a storage device coupled to the host device when the cache mode is the uncached mode;

receiving, at the host device, a second notification about a second solid state device, coupled to the host device, indicating that the second solid state device has been detected for use as a cache memory device;

setting, at the host device, the cache mode of the memory system to a cached mode in response to receiving the second notification;

allocating, at the host device, an amount of cache space of the cache memory device of the second solid state device to an input/output (I/O) generator based on a priority associated with the input/output generator;

receiving information about a source of input/output (I/O) requests; and excluding the input/output (I/O) requests from input/output (I/O) caching statistics based on the source of the I/O requests.

12. The non-transitory computer readable media of claim 11, wherein the instructions further cause:
prioritizing the input/output (I/O) caching statistics of the cache memory device such that higher ranked input/output (I/O) is flushed from the cache memory device less frequently.

13. The non-transitory computer readable media of claim 12, wherein the higher ranked input/output (I/O) is based on a predetermined priority associated with an application.

14. The non-transitory computer readable media of claim 12, wherein the higher ranked input/output (I/O) is based on a predetermined priority associated with a user.

15. The non-transitory computer readable media of claim 7, wherein the instructions further cause:
identifying lower priority applications for which data is less likely to be cached.

16. The non-transitory computer readable media of claim 7, wherein the instructions further cause:
identifying lower priority applications for which data may expire from the cache memory device quicker.

17. The non-transitory computer readable media of claim 7, wherein the information indicates the source is an application.

18. The non-transitory computer readable media of claim 17, wherein the application comprises one of a virus scanner, a backup software, a software installer, or a software upgrade.

19. The non-transitory computer readable media of claim 7, wherein the information indicates the source is associated with a user.

20. The non-transitory computer readable media of claim 7, wherein the information indicates the source is associated with a group or subnet.

* * * * *